United States Patent
Shinde et al.

(10) Patent No.: US 12,511,517 B2
(45) Date of Patent: Dec. 30, 2025

(54) CLOUD MIGRATION

(71) Applicant: Accenture Global Solutions Limited, Dublin (IE)

(72) Inventors: Lalit Shinde, Thane (IN); Karthik Gowda, Navi Mumbai (IN); Chandan Singh, Bengaluru (IN); Abhinav Raj, Pune (IN); Rajesh Babu Madhavaraj, Chennai (IN); Surendravikram Singh, Bangalore (IN); Santhana Gopala Krishnan Natarajan, Frisco, TX (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 722 days.

(21) Appl. No.: 17/895,248

(22) Filed: Aug. 25, 2022

(65) Prior Publication Data

US 2024/0070435 A1   Feb. 29, 2024

(51) Int. Cl.
*G06N 3/04*   (2023.01)
*G06F 9/48*   (2006.01)

(52) U.S. Cl.
CPC ............ *G06N 3/04* (2013.01); *G06F 9/4875* (2013.01)

(58) Field of Classification Search
CPC ....... G06F 9/4875; G06F 9/5005; G06N 3/04; G06N 3/045; G06N 3/08
See application file for complete search history.

(56) References Cited

U.S. PATENT DOCUMENTS

| | | | |
|---|---|---|---|
| 2019/0228508 A1* | 7/2019 | Price | G06T 5/70 |
| 2021/0176203 A1* | 6/2021 | Nizar | H04L 51/08 |
| 2023/0009930 A1* | 1/2023 | Wang | G06F 9/4856 |
| 2023/0186095 A1* | 6/2023 | Da Costa | G06N 3/048 |
| | | | 706/25 |

OTHER PUBLICATIONS

Sabiri, Khadija, and Faouzia Benabbou. "Methods migration from on-premise to cloud." IOSR Journal of Computer Engineering 17.2 (2015): 58-65. (Year: 2015).*

(Continued)

*Primary Examiner* — Cheyne D Ly
(74) *Attorney, Agent, or Firm* — Mannava & Kang, P.C.

(57) ABSTRACT

This disclosure relates to cloud migration. In some aspects, a method includes receiving, by one or more computing devices, a plurality of parameters associated with an on-premises system to be migrated to a cloud architecture, the plurality of parameters including an identifier of the on-premises system, identifiers of components of the on-premises system, and migration requirements; extracting, from the plurality of parameters, a set of input parameters substantially affecting a migration of the on-premises system to the cloud architecture; identifying a target cloud architecture, selected from a plurality of cloud architectures, that i) is compliant with the set of input parameters, and ii) satisfies one or more threshold conditions associated with the migration; determining, a set of output parameters representing features of the target cloud architecture; and training, a neural network model using the set of input parameters and the set of output parameters.

16 Claims, 7 Drawing Sheets

(56) References Cited

OTHER PUBLICATIONS

Frey, Sören and Hasselbring, Wilhelm (2010) Model-Based Migration of Legacy Software Systems into the Cloud: The CloudMIG Approach . Open Access Softwaretechnik-Trends, 30 (2). pp. 84-85. (Year: 2010).*
Frey et al., Model-Based Migration of Legacy Software Systems to Scalable and Resource-Efficient Cloud-Based Applications: The CloudMIG Approach, Proceedings of the First International Conference on Cloud Computing, GRIDs, and Virtualization (Cloud Computing 2010) . ; pp. 155-158 . (Year: 2010).*
Georgios Zoumpourlis, Alexandros Doumanoglou, Nicholas Vretos, Petros Daras; Proceedings of the IEEE International Conference on Computer Vision (ICCV), 2017, pp. 4761-4769. (Year: 2017).*
Liao et al., A deep convolutional neural network module that promotes competition of multiple-size filters, Pattern Recognition 71 (2017) 94-105. (Year: 2017).*
Altowaijri, "Toward Cloud Computing Transition using Deep Learning Collaborative Recommendation Platform," International Journal of Computer Science and Network Security, Mar. 2020, 20(3):229-237.

\* cited by examiner

200A

Receive a plurality of parameters associated with an on-premises system to be migrated to a cloud architecture  202

Extract, from the plurality of parameters, a set of input parameters substantially affecting the migration  204

Receive a target cloud architecture, selected from a plurality of cloud architectures  206

Extract a set of output parameters of the target cloud architecture  208

Train a neural network model using the set of input parameters and the set of output parameters  210

FIG. 2A

CLOUD MIGRATION

TECHNICAL FIELD

This specification generally relates to cloud migration.

BACKGROUND

Cloud migration is a process of moving data, applications or other digital content of an on-premises system from a local data center to a cloud computing environment. Cloud migration can allow organizations or enterprises to take advantage of benefits such as greater elasticity, redundancy, and a flexible pay-per-use model.

SUMMARY

In one aspect, this document describes a method for cloud migration. The method includes receiving, by one or more computing devices, a plurality of parameters associated with an on-premises system to be migrated to a cloud architecture, the plurality of parameters including an identifier of the on-premises system, identifiers of components of the on-premises system, and migration requirements; extracting, from the plurality of parameters, a set of input parameters substantially affecting a migration of the on-premises system to the cloud architecture; identifying a target cloud architecture, selected from a plurality of cloud architectures, that i) is compliant with the set of input parameters, and ii) satisfies one or more threshold conditions associated with the migration; determining, a set of output parameters representing features of the target cloud architecture; and training, a neural network model using the set of input parameters and the set of output parameters.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, extracting the set of input parameters includes: executing extraction script at the on-premises system to extract metadata of the on-premises system; and generating the set of input parameters based on analyzing the metadata of the on-premises system.

In some implementations, the set of input parameters includes at least one of database edition, database version, RAC, database size, database operating system, archive log mode, number of CPU cores, workload type, database services, ADB features, database features, critical status, network bandwidth, and outage window, and the set of output parameters includes at least one of: target cloud versions, migration methods, target cloud shapes and sizes, licensing impact, and estimated time.

In some implementations, training the neural network model includes determining an order of multiple layers and a dependency between a node in a previous layer and a node in a layer following the previous layer in the neural network.

In some implementations, training the neural network model includes applying a convolutional filter to each layer of the neural network.

In some implementations, the method includes: applying a first convolutional filter to generate a first feature map; applying a second convolutional filter to generate a second feature map; combining the first feature map and the second feature map to generate a multi-dimensional filter; and applying the multi-dimensional filter to each layer of the neural network.

In some implementations, the method includes: after applying a convolutional filter to each layer of the neural network to generate a result matrix; and applying a rectified linear unit activation function to the result matrix to generate a second result matrix.

In some implementations, the method includes applying max pooling to the second result matrix. In some implementations, the plurality of cloud architectures are from different vendors.

In some implementations, the method includes: receiving, by a server, a request to migrate a second on-premises system to a second cloud architecture, the request comprising a second plurality of parameters associated with the second on-premises system to be migrated to the second cloud architecture, the second plurality of parameters including an identifier of the second on-premises system, identifiers of components of the second on-premises system, and second migration requirements; extracting, by the server from the second plurality of parameters, a second set of input parameters substantially affecting a migration of the second on-premises system to the second cloud architecture; executing, by the server, the trained neural network model using the second set of input parameters to obtain a second set of output parameters associated with a second target cloud architecture; and selecting, by the server from a plurality of cloud architectures, a second target cloud architecture using the second set of output parameters, wherein the second target cloud architecture i) is compliant with the second set of input parameters, and ii) satisfies one or more threshold conditions associated with the migration.

Particular implementations of the subject matter described in this disclosure can be implemented so as to realize one or more of the following advantages. By using a trained neural network model to recommend a suitable cloud architecture for migrating an on-premises system, various parameters of both the on-premises system and the cloud architecture can be accounted for. This in turn can potentially result in improved recommendations as compared to manual or ad-hoc mapping of requirements during a migration process. For example, by training a neural network using parameters of both on-premises and cloud systems, myriad inter-dependencies may be accounted for—thereby resulting in the recommended cloud architecture being optimally suited for a particular migration process. In addition, processes such as convolutional filters, rectified linear unit (ReLu) activation functions, and max pooling can be leveraged during training of the neural network, which allows for the neural network to be trained efficiently in terms of time, energy consumption, and/or computational efficiency. Overall, the technology described herein can potentially allow for a seamless and efficient migration of on-premises systems to a cloud-based architecture—thereby potentially avoiding delays and other issues resulting from an improper match-up between the on-premises system and cloud architecture.

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2A-2C are example processes for training a neural network model for cloud migration.

DETAILED DESCRIPTION

Cloud migration can move databases, applications, services, workloads, or other digital content of an on-premises system from a local data center to a cloud computing environment. The on-premises system can include a set of databases, applications, services, workloads, or other digital content that executes on hardware located at a location that is physically accessible to a corresponding entity, such as an organization or enterprise. However, due to the large number of parameters of the on-premises system and different cloud providers, it can be challenging and burdensome to identify a target cloud architecture/system that is optimally suited for a given on-premises system. The systems and methods described in this specification can assess interdependencies of various technical components, underlying infrastructure fabric, application specific non-functional requirements (NFRs) of the on-premises system; map them against each cloud providers' service releases, specifications, features currently being offered, and features being updated over future; and provide guidance on selection cloud vendors and cloud infrastructure options. Furthermore, the systems and methods described in this specification can train a neural network model for the recommendation of target cloud architectures. The systems and the methods described in this specification can train the neural network model in an efficient way. Specifically, the neural network model can be trained by applying various tools such as convolutional filters, ReLu activation functions, and max pooling. As a result, the computation complexity can be significantly reduced, and therefore the energy consumption and the computational resources required for the training of the neural network can be significantly reduced, as compared to neural network training without such tools, e.g., convolutional filters, ReLu activation functions, and max pooling.

Figure 1:
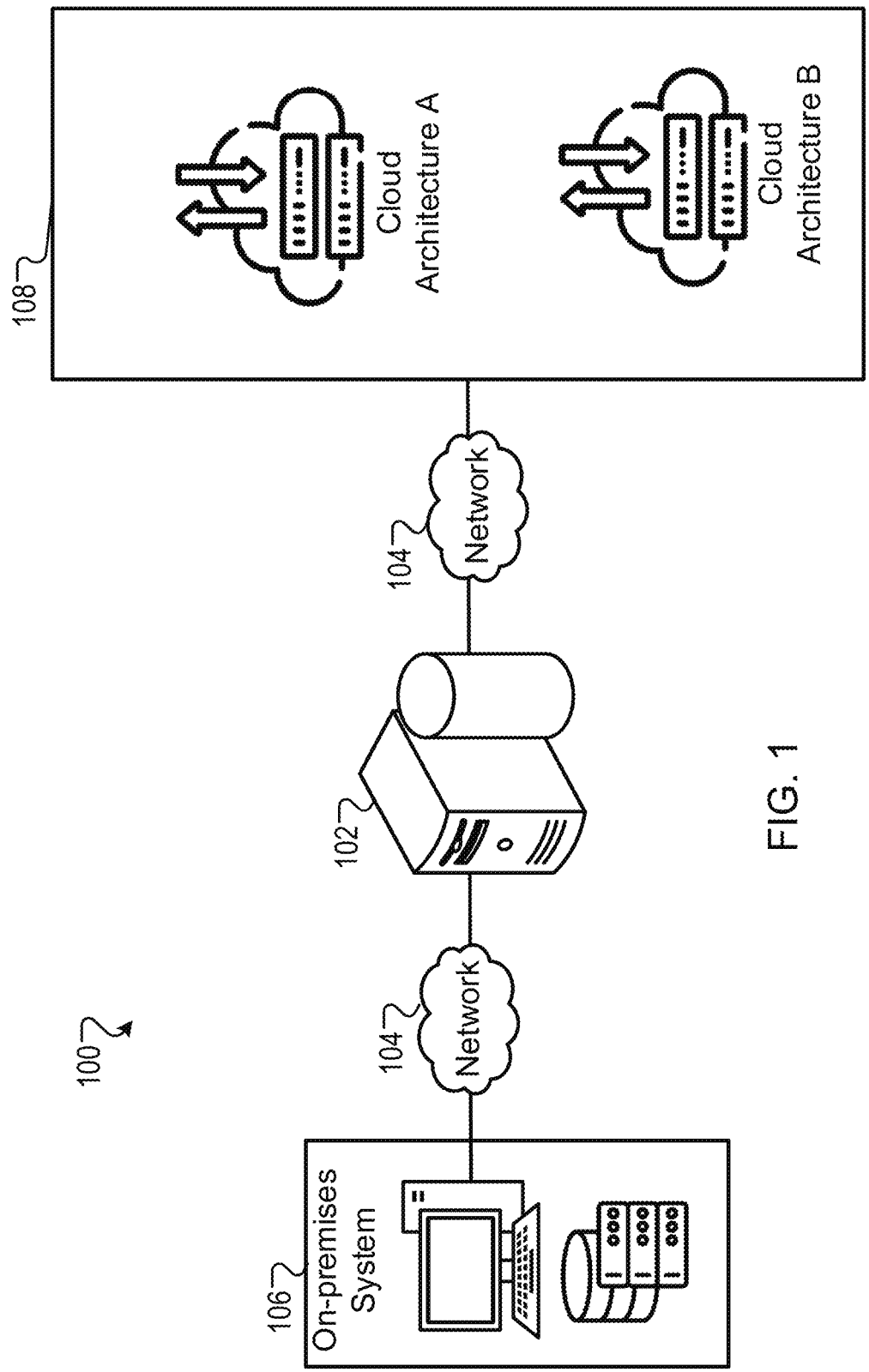
FIG. 1 is a block diagram of an example environment for cloud migration.

FIG. 1 is a block diagram of an example environment 100 for cloud migration in accordance with technology described herein. The example environment 100 includes a server 102, a network 104, an on-premises system 106, and a plurality of cloud architectures 108.

The on-premises system 106 can be a system located in a local on-premises infrastructure of an entity, such as an organization or enterprise. The on-premises system can include a set of databases, applications, services, workloads, or other digital content that executes on hardware located at a location that is physically accessible to the corresponding entity. The entity can request to migrate at least part of the on-premises system to a cloud architecture for various reasons, such as increased flexibility, increasing resource demands, reduction in costs, etc.

The server 102 can receive the request from a user device (not shown) associated with the entity over the network 104, such as Internet. The request can include a plurality of parameters associated with the on-premises system. For example, the plurality of parameters can include an identifier of the on-premises system, identifiers of components of the on-premises system, migration requirements, and the like.

The server 102 can use a neural network model to predict the features of a target cloud architecture. Specifically, the server 102 can extract, from the plurality of parameters, a set of input parameters substantially affecting the migration of the on-premises system. The server 102 can use the set of input parameters to execute a trained neural network model to obtain a set of output parameters. The set of output parameters can correspond to the recommended features of a target cloud architecture for the on-premises system.

Figure 3:
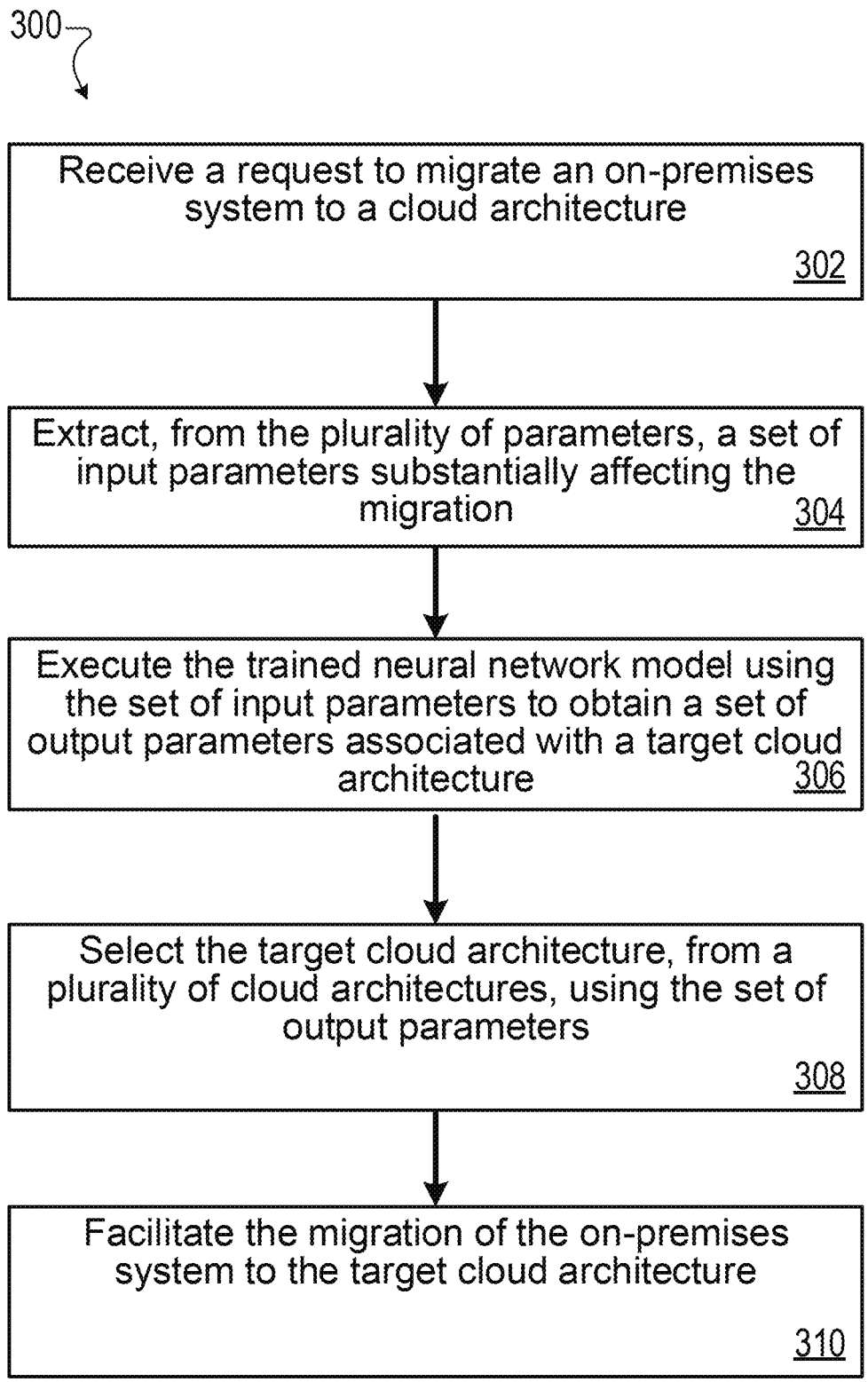
FIG. 3 is a flow diagram of an example process for cloud migration using the trained neural network model.
Figure 4:
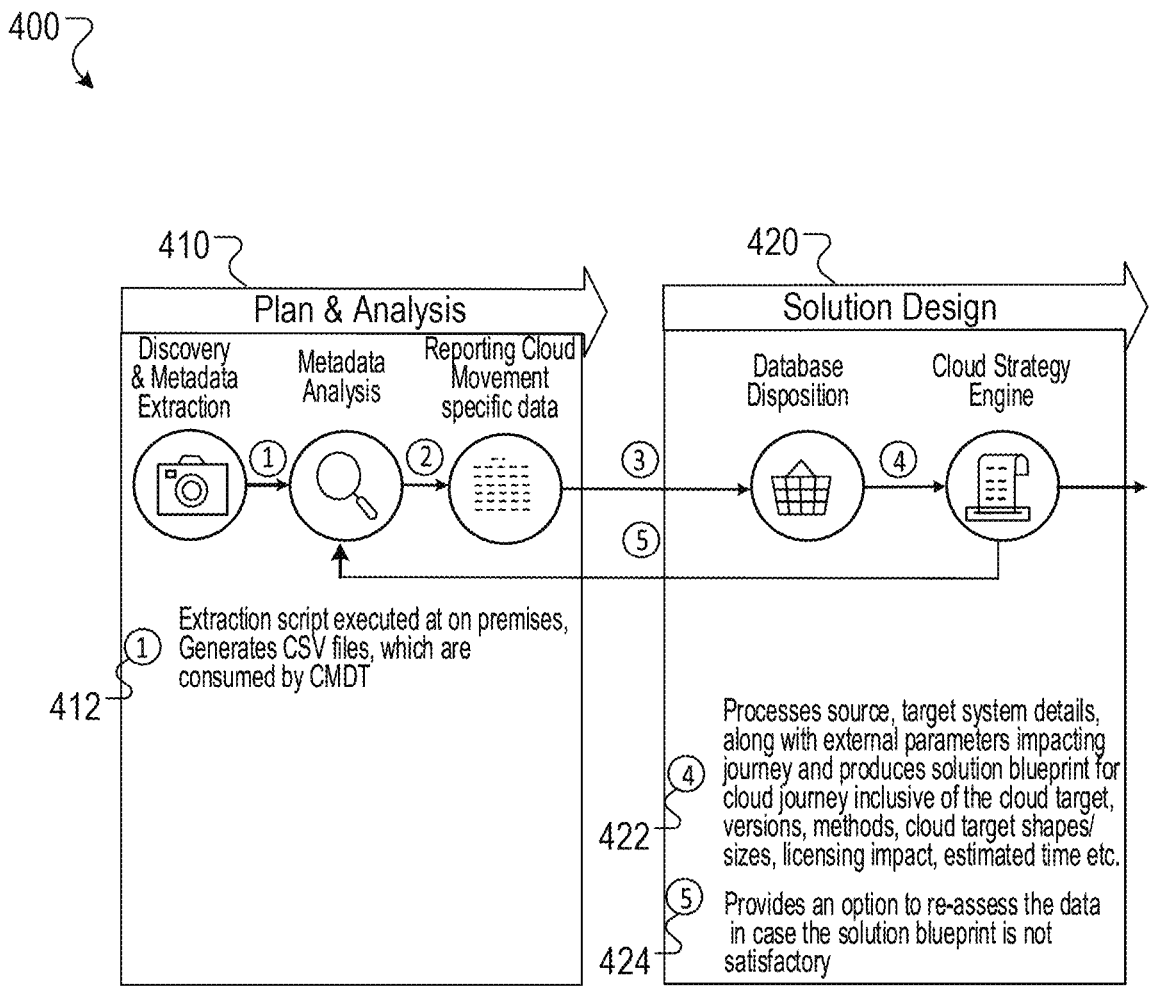
FIG. 4 is a block diagram of an example process for training a neural network model for cloud migration.

The server 102 can select the target cloud architecture from the plurality of available cloud architectures 108, based on the recommended features of the target cloud architecture, e.g., the set of output parameters. The plurality of cloud architectures 108 can be provided by different vendors or cloud service providers. The different vendors can provide different cloud architectures 108 with different system settings and technologies. The different vendors can provide cloud migration services with different costs and performances. The server 102 can retrieve service releases, specifications, features currently being offered, and features being updated over future, of the multiple available cloud architectures provided by different vendors. The server can collect metadata of the multiple cloud architectures across different vendors over the network 104, and select one or more target cloud architectures whose metadata matching the recommended features from the neural network model. After selecting the target cloud architecture, the server 102 can facilitate the migration of the on-premises system 106 to the target cloud architecture over the network 104. FIGS. 3-4 and associated description provide additional details of these implementations.

Figure 2B:
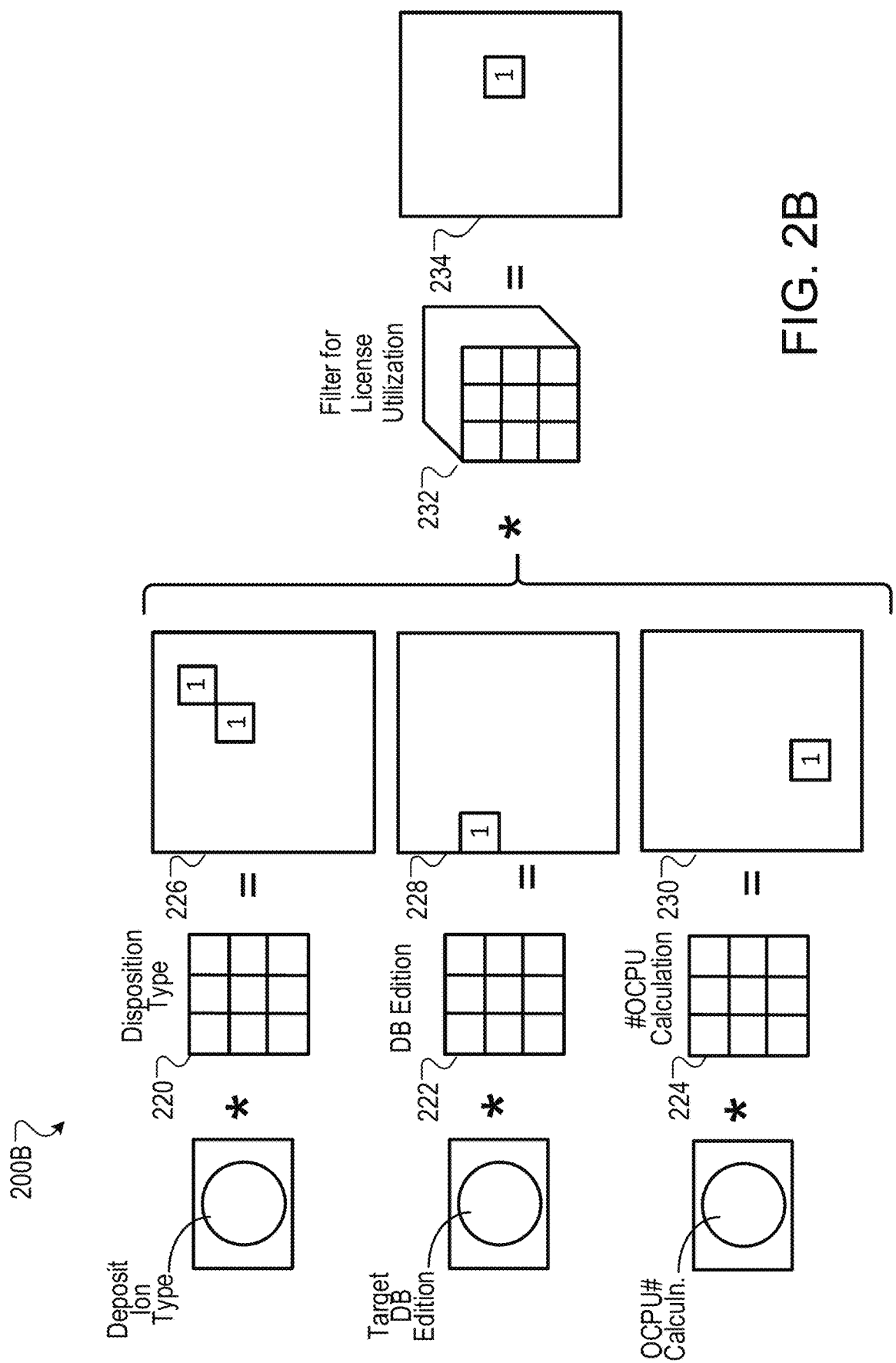
Figure 2C:
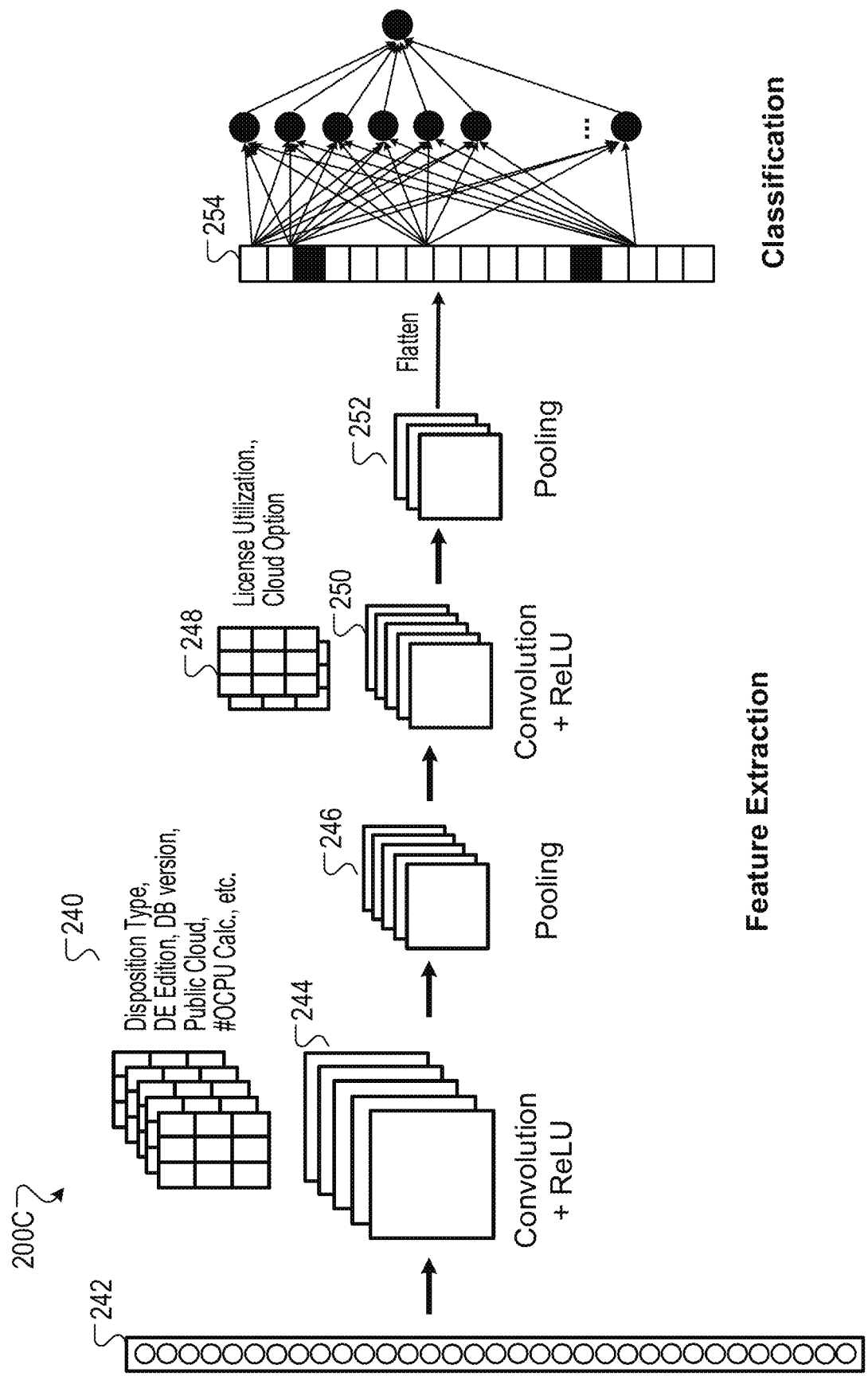

In some implementations, the neural network model can be trained by the server 102 beforehand. In some implementations, the neural network model can be trained at another computing device (not shown) and a trained model may be provided to the server 102. FIGS. 2A-2C and associated description provide additional details of the training of the neural network model.

The server 102 can be a computing system including one or more computing devices. The various functional components of the server 102 may be installed on one or more computers as separate functional components or as different modules of a same functional component. For example, the various components of the server 102 can be implemented as computer programs installed on one or more computers in one or more locations that are coupled to each through a network. In cloud-based systems for example, these components can be implemented by individual computing nodes of a distributed computing system.

The user device issuing the request can be an electronic device that is capable of communicating over the network 104. The network 104 can include a local area network ("LAN"), wide area network ("WAN"), the Internet, or a combination thereof. Example user devices can include personal computers, mobile communication devices, e.g., smart phones, and other devices that can send and receive data over the network 104. The user device can also include a digital assistant device. The digital assistant can be implemented in different forms of hardware devices including, a wearable device (e.g., watch or glasses), a smart phone, a speaker device, a tablet device, or another hardware device.

FIG. 2A is a flow diagram of an example process 200A for training a neural network model for cloud migration. In some implementations, at least a portion of the process 200 can be executed at the server 102.

At step 202, the server can receive a plurality of parameters associated with an on-premises system to be migrated to a cloud architecture. The plurality of parameters can include an identifier of the on-premises system, identifiers of components of the on-premises system, migration requirements, and the like.

The plurality of parameters can include the identifier of the on-premises system for the server to locate/identify the on-premises system. The plurality of parameters can include the identifiers of components of the on-premises system, such as the databases, applications, services, workloads included in the on-premises system. In some implementations, part of the on-premises system is to be migrated to a cloud architecture. The plurality of parameters can include the identifiers of the components of the on-premises system that are to be migrated. The plurality of parameters can include the migration requirements, such as cost and performance requirements to be satisfied for the migration of the on-premises system. The cost requirement can include a budget threshold. The performance requirement can include requirements for security, efficiency, flexibility, and the like. The security requirements can include encryption at rest and over network, auditing, logging, single sign-on, secure sockets layer (SSL) implementations, etc. The efficiency and flexibility can include high availability, scalability, recoverability, disaster recovery options, etc. The performance requirement can include one or more performance thresholds.

At step 204, the server can extract, from the plurality of parameters, a set of input parameters substantially affecting a migration of the on-premises system to the cloud architecture.

Extracting the set of input parameters can include executing an extraction script at the on-premises system to extract metadata of the on-premises system, and generating the set of input parameters based on analyzing the metadata of the on-premises system. In some implementations, by executing the script, the server can extract the metadata of the on-premises system and identify the features and execution environment of the on-premises system. Based on analyzing the metadata, the server can generate a set of input parameters that can be used to determine the features of the cloud architecture.

The set of input parameters substantially affecting the migration can include, for example, at least one of a database edition, a database version, real application clusters (RAC), database size, database operating system, archive log mode, number of central processing unit (CPU) cores, workload type, database services, autonomous database (ADB) features, database features, critical status, network bandwidth, outage window, etc. The values of the set of input parameters can provide metadata of the on-premises system. For example, the database version can be used to determine whether support is available at the product vendor, or whether the database is outdated or on verge of support expiry. The database edition can refer to various database features, option, packs and other products that enhance the capability of database for specific purposes. In some examples, the critical status of the on-premises system can affect the selection of the target cloud architecture. For example, if the critical status is "yes," the selection of the target cloud architecture may be stricter, e.g., the features of the target cloud architecture need to be more strictly match the features of the on-premises system, or a larger number of the target cloud architecture's features need to match the on-premises system's features.

At step 206, the server can identify/select a target cloud architecture from a plurality of cloud architectures, that i) is compliant to the set of input parameters, and ii) satisfies one or more threshold conditions associated with the migration.

In some implementations, the server can receive an identifier of a target cloud architecture that is compliant to the set of input parameters, such as a target cloud architecture whose metadata matches the features of the on-premises system. For example, the target cloud architecture can be such that the database version of the target cloud architecture matches the database version of the on-premises system. If the on-premises system includes multiple requirements, such as the database size, the number of CPU cores, the database services, the target cloud architecture need to be able to satisfy all of the multiple requirements. Furthermore, the server can identify the migration path for migrating the on-premises system to the target cloud architecture. For example, the server can identify one or more target cloud architectures that satisfy the requirements of the on-premises system, the server can further determine the migration methods or the migration paths to migrate the on-premises system to the target cloud architectures. For instance, the migration paths can include infrastructure as a service (IaaS), platform as a service (PaaS), and software as a service (SaaS). The server can choose one of the migration paths based on the database version, data editions, workload type, dedicated/shared infrastructure, features, RAC option, and other features available in the on-premises system and the respective mapped features in the cloud architecture.

In some implementations, the server can consider the cost and performance requirements for migrating the on-premises system to the cloud architecture. The target cloud architecture can be selected such that the selected cloud architecture satisfies one or more threshold conditions associated with the on-premises system. For example, the target cloud architecture can provide services that satisfy the performance thresholds required by the entity. In another example, migration to the target cloud architecture can satisfy the cost thresholds or requirements, e.g., budget thresholds, by providing options of license requirements for the migration of the on-premises system into cloud architectures.

The target cloud architecture can be selected from a plurality of cloud architectures provided by different vendors. The different vendors can provide different cloud architectures with different system settings and technologies, such as system implementations with IaaS or PaaS components. The different vendors can provide cloud migration services with different costs and performances.

At step 208, the server can extract a set of output parameters of the target cloud architecture. The set of output parameters can include the metadata or the features of the target cloud architecture. For example, the set of output parameters can include target cloud versions, migration methods, target cloud shapes and sizes, licensing impact, etc. The set of output parameters can include other relevant parameters, such as cloud database option, database version, deployment options, number of ORACLE central processing unit (OCPU), virtual machine size/shape, virtual machine storage, operating system, memory allocated, backup size, etc. The ORACLE system is used as an example. The methods and systems described in this specification are not limited to the ORACLE system. In some implementations, the migration methods can depend on the on-premises system and target cloud architecture compatibility, target cloud database, database size, archive log mode, allowed downtime window, product license availability, etc., which can help in decision making of the appropriate migration path. For instance, one migration path may include migrating the on-premises system to cloud architecture A that requires the customer to pay for the product license. Another migration path may include migrating the on-premises system to cloud architecture B that does not require payment for product license.

At step 210, the server can train a neural network model using the set of input parameters and the set of output parameters. The neural network can include layers of interconnected nodes. The neural network can include an input layer, one or more hidden layers, and an output layer. Each layer can include a set of nodes or neurons. Each node connects to another and has an associated weight and threshold. If the output of any individual node is above the specified threshold value, that node is activated, sending data to the next layer of the neural network. Otherwise, no data is passed along to the next layer of the neural network.

Once an input layer is determined, weights can be assigned. These weights help determine the importance of any given variable, with larger ones contributing more significantly to the output compared to other inputs. All inputs are then multiplied by their respective weights and then summed. Afterwards, the output is passed through an activation function, which determines the output. If that output exceeds a given threshold, it activates the node, passing data to the next layer in the network. This result in the output of the node becomes the input of the next node in the next layer. This process of passing data from one layer to the next layer defines the neural network as a feedforward network.

An initial weight can be assigned to each node of the neural network. The values of the set of input parameters corresponding to the metadata or the features of the on-premises system are provided into the input layer. The one or more hidden layers can process the outputs from the previous layer. The output layer can provide one or more classification or prediction results. In other words, the input layer collects input patterns. The output layer has classification or out signals to which input patterns may map. The hidden layers can extrapolate salient features in the input data that have predictive power regarding the outputs.

As discussed above, an initial weight can be assigned to each node of the neural network. During the training process of the neural network, the weight of each node in the neural network are adjusted. More specifically, an output value can be determined using the neural network with the initial weight. The output value can be compared with a target output value included in the set of output parameters to compute an error. For example, the result of the output layer can be compared with the values of the one or more output parameters corresponding to the metadata or features of the target cloud architecture to obtain the error. In response to determining that the error satisfies a threshold, e.g., above a threshold, the server can update the weight of each node based on the error.

The process in which the server adjusts the weights can be through gradient descent, allowing the neural network model to determine the direction to take to reduce or minimize the error.

In some implementations, the training of the neural network model can be through backpropagation. For example, the adjusting of the weights can move in the direction from output to input. Backpropagation allows the server to calculate and attribute the error associated with each node, and allows adjusting and fitting the values of the model, such as the weight of each node, appropriately.

The process of training the neural network model and the adjusting of the weights can be performed iteratively, until the error of the output layer is minimized or satisfies a threshold condition, e.g., falls below a threshold value.

In the process of training the neural network model, the server can determine an order of multiple hidden layers and a dependency between a node in a previous layer and a node in a layer following the previous layer in the neural network. For example, the feature of "license utilization" may depend on the features of "target database option," "target operating system family," and "target operating system version." As a result, the layer including the feature of "license utilization" follows the layers including the features of "target database option," "target operating system family," and "target operating system version."

Due to the large number of parameters of the on-premises system and different cloud providers, the training of the neural network model can have a high complexity. For example, the average number of input parameters is 150, and the average number of values per parameter is 20. As a result, the number of first layer neuros is 150*20=3000. Assuming that the number of hidden layer neuros is 5000, the number of weights included in the input layer and the hidden layers would be 3000*5000=15,000,000. In some implementations, the server can apply a convolutional filter to each layer of the neural network to reduce the computational complexity. Specifically, by applying the convolutional filters, e.g., single-dimensional filters and multi-dimensional filter, the server can significantly reduce the computation complexity, and reduce power and resource consumption for training the neural network model.

A convolutional filter can be a feature detector. Applying a convolutional filter to an input, e.g., a previous layer, can generate a feature map. The feature map indicates the locations and strength of a detected feature in the input, e.g., summarizes the presence of detected features in the input. For example, a convolutional filter can be a matrix corresponding to the feature of database edition. By applying the convolutional filter of the database edition to each layer of the neural network, the locations and the strength of the database edition feature can be obtained in the feature map. The convolutional filter can be adjusted during the training of the neural network model based on the error of the output.

In some implementations, the server can apply a multi-dimensional filter to each layer of the neural network. The server can create the multi-dimensional filter by combining multiple feature maps that are each obtained using a respective single-dimensional convolutional filter. The server can apply a first convolutional filter to each layer of the neural network to generate a first feature map. The server can apply a second convolutional filter to each layer of the neural network to generate a second feature map. The server can combine the first feature map and the second feature map to generate a multi-dimensional filter. After the multi-dimensional filter is generated, the server can apply the multi-dimensional filter on each layer of the neural network.

FIG. 2B is a block diagram of an example process for generating a multi-dimensional filter for training the neural network model. As shown in FIG. 2B, the server can apply three single-dimensional filters including "disposition type filter" 220, "database edition filter" 222, and "number of ORACLE central processing unit (OCPU) calculation filter" 224, to each layer of the neural network. After applying the three single-dimensional filters, the server can generate three respective feature maps 226, 228, and 230. The server can combine the three feature maps 226, 228, and 230 to generate a multi-dimensional filter for "license utilization" 232. The server can apply the multi-dimensional filter 232 to each layer of the neural network to generate another feature map 234 that summarizes the presence of the detected features corresponding to the multi-dimensional filter.

In some implementations, the server can further reduce the computation complexity by applying rectified linear unit (ReLu) activation function and max pooling. The ReLu activation function is a piecewise linear function for which the output is equal to the input for all positive inputs, and is equal to zero otherwise. Maximum pooling, or max pooling, is a pooling operation that calculates the maximum, or largest, value in each region of a predetermined size in a feature map. Specifically, while the region of the feature map includes multiple values, the max pooling retrains the maximum value to represent the region and discards other values in the region. Thus, max pooling results in fewer values in the feature map. The generated results are down sampled feature maps or pooled feature maps that highlight the most present feature in each region of the feature map. Because the number of values in the feature map is reduce, the computational complexity for training the neural network model is reduced.

FIG. 2C is a block diagram of an example process for applying convolutional filters, ReLu activation function, and max pooling in the training of the neural network model. One or more convolutional filters are applied in each layer of the neural network. For example, the disposition type filter, database edition filter, database version filter, public cloud filter, and number of ORACLE central processing unit (OCPU) calculation filter 240 are applied in the input layer 242. After applying the convolutional filters 240, feature maps 244 can be obtained. The ReLu activation function can be applied to each of the feature maps 244 to obtain rectified feature maps. Furthermore, max pooling can be applied on the rectified feature maps to obtain down-sampled feature maps 246. One or more multi-dimensional convolutional filters 248 can be further applied to the down-sampled feature maps 246 to obtain a new set of feature maps 250. The ReLu activation function can be applied to the new set of feature maps 250 to obtain a new set of rectified feature maps. Furthermore, max pooling can be applied on the new set of rectified feature maps to obtain a new set of down-sampled feature maps 252. The new set of down-sampled feature maps 252 can be input into the next layer 254 of the neural network. In the next layer 254 of the neural network, the convolutional filters, ReLu activation function, and max pooling can be applied in a similar manner. This process can be applied in each layer of the neural network for feature extraction until the processing reaches the output layer of the neural network. By applying some combination of convolutional filters, ReLu activation functions, and/or max pooling in the training of the neural network model, the computational complexity can be significantly reduced, and therefore the energy consumption and the computational resources required for the training of the neural network can also be significantly reduced, thereby making the training process efficient in multiple aspects. For instance, in the example discussed above, the number of weights included in the input layer and the hidden layers is 15,000,000. By applying some combination of convolutional filters, ReLu activation functions, and/or max pooling, the computation complexity can be significant reduce to the average range of 10000-15000, as compared to the original 15,000,000 computation complexity.

In some implementations, the neural network can include at least one of a convolutional neural network (CNN) or recurrent neural network (RNN). In a preferred embodiment, the neural network is CNN. However, the neural network is not limited to CNN.

The order of steps in the process 200 described above is illustrative only, and the process 200 can be performed in different orders. In some implementations, the process 200 can include additional steps, fewer steps, or some of the steps can be divided into multiple steps.

FIG. 3 is a flow diagram of an example process for cloud migration 300 using the trained neural network model. In some implementations, at least a portion of the process 300 can be executed at the server 102.

At step 302, the server can receive a request to migrate an on-premises system to a cloud architecture. The request can include a plurality of parameters associated with the on-premises system. The plurality of parameters can include an identifier of the on-premises system, identifiers of components of the on-premises system, migration requirements, and the like.

For example, the server can receive a request from an entity, e.g., an organization or enterprise, to migrate an on-premises system to a cloud architecture. The on-premises system can be located in a local on-premises infrastructure of the entity. The entity can request to migrate at least part of the on-premises system to a cloud architecture for various reasons, such as increased flexibility, increasing resource demands, reduction in costs, etc.

The request can include the plurality of parameters associated with the on-premises system. For example, the plurality of parameters can include the identifier of the on-premises system for the server to locate the on-premises system to be migrated. The plurality of parameters can include the identifiers of components of the on-premises system, such as the databases, applications, services, workloads included in the on-premises system. In some implementations, part of the on-premises system is to be migrated to a cloud architecture. The plurality of parameters can include the identifiers of the components of the on-premises system that are to be migrated. The plurality of parameters can include the migration requirements, such as cost and performance requirements to be satisfied for the migration of the on-premises system. The cost requirement can include a budget threshold. The performance requirement can include requirements for security, efficiency, flexibility, and the like. The performance requirement can include one or more performance thresholds.

At step 304, the server can extract, from the plurality of parameters, a set of input parameters substantially affecting a migration of the on-premises system to the cloud architecture.

Extracting the set of input parameters can include executing extraction script at the on-premises system to extract metadata of the on-premises system, and generating the set of input parameters based on analyzing the metadata of the on-premises system. By executing the script, the server can extract the metadata of the on-premises system and better understand the features and execution environment of the on-premises system. Based on analyzing the metadata, the server can generate a set of input parameters that can be used to determine the features of the cloud architecture.

The set of input parameters substantially affecting the migration can include at least one of a database edition, a database version, real application clusters (RAC), database size, database operating system, archive log mode, number of central processing unit (CPU) cores, workload type, database services, autonomous database (ADB) features, database features, critical status, network bandwidth, outage window, etc.

At step 306, the server can execute the trained neural network model using the set of input parameters to obtain a set of output parameters associated with a target cloud architecture.

The trained neural network model can use a set of input parameters associated with the on-premises system to generate a set of output parameters associated with the target cloud architecture that is compliant with the set of input parameters and satisfies the threshold conditions associated with the migration, such as the performance thresholds and/or cost thresholds. The server can execute the trained neural network model to obtain the set of output parameters. The set of output parameters can indicate the metadata or features required for the target cloud architecture and can be used to identify the target cloud architecture.

The set of output parameters can include target cloud option, system versions, migration methods, target cloud shapes and sizes, licensing impact, estimated time, etc. The set of output parameters can include other relevant parameters, such as database version, deployment options, number of ORACLE central processing unit (OCPU), virtual machine size/shape, virtual machine storage, operating system, memory allocated, backup size, etc.

At step 308, the server can select the target cloud architecture, from a plurality of cloud architectures, using the set of output parameters. The target cloud architecture is compliant with the set of input parameters and satisfies the threshold conditions associated with the migration, such as the performance thresholds and/or cost thresholds.

The server can retrieve the releases and specifications of multiple available cloud architectures provided by different vendors. The server can collect metadata of the multiple cloud architectures across different vendors, including features currently being offered and features being updated over the future of the multiple cloud architectures. For example, the metadata of each cloud architecture can include cloud database options, cloud database infrastructure size and shape, storage types, cloud operating system, supported migration method, etc. The server can also assess the license and time estimates required for the cloud migration. The server can select the target cloud architecture whose metadata match the set of output parameters, or the target cloud architecture whose metadata satisfy all the output parameters.

The order of steps in the process 300 described above is illustrative only, and the process 300 can be performed in different orders. In some implementations, the process 300 can include additional steps, fewer steps, or some of the steps can be divided into multiple steps.

FIG. 4 is a block diagram of an example process for cloud migration 400 using the trained neural network model.

In the plan and analysis phase 410, the server can extract metadata of the on-premises system and generate the set of input parameters that influences the cloud migration. In step 1 412, after the server receives a request to migrate an on-premises system, the server can discover and extract metadata of the on-premises system. The server can execute extraction script at the on-premises system and generate comma-separated values (CSV) files, which can be consumed by cloud migration strategy engine.

In the solution design phase 420, the server can determine cloud strategy. In step 4 422, the server can process source system details and target system details, along with external parameters impacting the cloud migration journey. The server can produce solution blueprint for the cloud migration, such as the recommended features of the target cloud architecture. The recommendation features of the target cloud architecture can include identifier of the target cloud architecture, versions of the components of the target cloud architecture, methods for cloud migration, cloud target shapes/sizes, licensing impact, estimated time, etc. For example, the server can execute a trained neural network using the set of input parameters corresponding to the source system details. The server can obtain a set of output parameters from the neural network model. The set of output parameters can correspond to the solution blueprint data, such as the recommended features of the target cloud architecture. In step 5 424, the server can provide an option to re-assess the data in case the solution blueprint is not satisfactory. For example, the server can include a function to reprocess the request to generate one or more new recommendations for the target cloud architectures.

Figure 5:
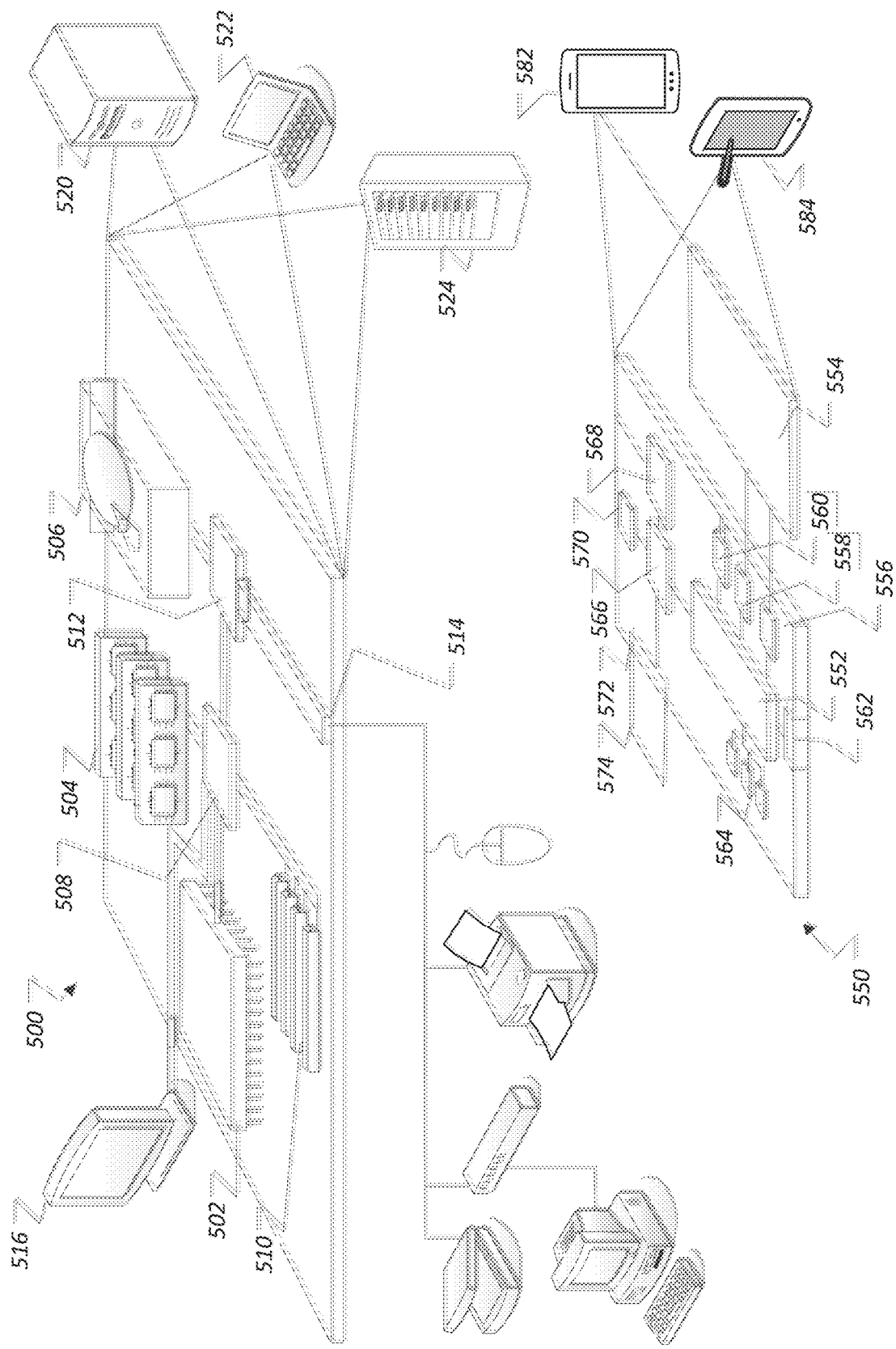
FIG. 5 illustrates block diagrams of example computing devices.

FIG. 5 shows an example of a computing device 500 and a mobile computing device 550 (also referred to herein as a wireless device) that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 500 can form at least a portion of the server 102.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 514 through a network adapter. Such network input/output devices may include, for example, a switch or router.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. Other implementations may include a phone device 582 and a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

The invention claimed is:

1. A computer-implemented method comprising:
receiving, by one or more computing devices, a plurality of parameters associated with an on-premises system to be migrated to a cloud architecture, the plurality of parameters including an identifier of the on-premises system, identifiers of components of the on-premises system, and migration requirements;
extracting, from the plurality of parameters, a set of input parameters substantially affecting a migration of the on-premises system to the cloud architecture,
  wherein the set of input parameters comprises a database version and a number of central processing unit (CPU) cores, and
  wherein the database version indicates whether support is available at a product vendor associated with the cloud architecture, or whether the database is outdated or on verge of support expiry;
identifying a target cloud architecture, selected from a plurality of cloud architectures, that i) is compliant with the set of input parameters, and ii) satisfies one or more threshold conditions associated with the migration;
determining, a set of output parameters representing features of the target cloud architecture; and
training, a neural network model using the set of input parameters and the set of output parameters, wherein training the neural network model comprises:
  applying a first convolutional filter including a database version filter to generate a first feature map corresponding to the database version;
  applying a second convolutional filter including a number of CPU calculation filter to generate a second feature map corresponding to the number of CPU cores;
  combining the first feature map and the second feature map to generate a multi-dimensional filter; and
  applying the multi-dimensional filter to each layer of a neural network of the neural network model.

2. The computer-implemented method of claim 1, wherein extracting the set of input parameters comprises:
executing extraction script at the on-premises system to extract metadata of the on-premises system; and
generating the set of input parameters based on analyzing the metadata of the on-premises system.

3. The computer-implemented method of claim 1,
wherein the set of input parameters further comprises at least one of database edition, real application clusters (RAC), database size, database operating system, archive log mode, workload type, database services, autonomous database (ADB) features, database features, critical status, network bandwidth, and outage window, and
wherein the set of output parameters comprises at least one of: target cloud versions, migration methods, target cloud shapes and sizes, licensing impact, and estimated time.

4. The computer-implemented method of claim 1, wherein training the neural network model further comprises:
determining an order of multiple layers and a dependency between a node in a previous layer and a node in a layer following the previous layer in the neural network.

5. The computer-implemented method of claim 1, comprising:
after applying the multi-dimensional filter to each layer of the neural network to generate a result matrix; and
applying a rectified linear unit activation function to the result matrix to generate a second result matrix.

6. The computer-implemented method of claim 5, comprising:
applying max pooling to the second result matrix.

7. The computer-implemented method of claim 1, wherein the plurality of cloud architectures are from different vendors.

8. The computer-implemented method of claim 1, comprising:
receiving, by a server, a request to migrate a second on-premises system to a second cloud architecture, the request comprising a second plurality of parameters associated with the second on-premises system to be migrated to the second cloud architecture, the second plurality of parameters including an identifier of the second on-premises system, identifiers of components of the second on-premises system, and second migration requirements;
extracting, by the server from the second plurality of parameters, a second set of input parameters substantially affecting a migration of the second on-premises system to the second cloud architecture;

executing, by the server, the trained neural network model using the second set of input parameters to obtain a second set of output parameters associated with a second target cloud architecture; and selecting, by the server from a plurality of cloud architectures, a second target cloud architecture using the second set of output parameters, wherein the second target cloud architecture i) is compliant with the second set of input parameters, and ii) satisfies one or more threshold conditions associated with the migration.

9. A non-transitory computer-readable medium encoded with instructions that, when executed by one or more computers, cause the one or more computers to perform operations comprising:

receiving a plurality of parameters associated with an on-premises system to be migrated to a cloud architecture, the plurality of parameters including an identifier of the on-premises system, identifiers of components of the on-premises system, and migration requirements;

extracting, from the plurality of parameters, a set of input parameters substantially affecting a migration of the on-premises system to the cloud architecture, wherein the set of input parameters comprises a database version and a number of central processing unit (CPU) cores, and wherein the database version indicates whether support is available at a product vendor associated with the cloud architecture, or whether the database is outdated or on verge of support expiry;

identifying a target cloud architecture, selected from a plurality of cloud architectures, that i) is compliant with the set of input parameters, and ii) satisfies one or more threshold conditions associated with the migration;

determining, a set of output parameters representing features of the target cloud architecture; and training, a neural network model using the set of input parameters and the set of output parameters, wherein training the neural network model comprises:

applying a first convolutional filter including a database version filter to generate a first feature map corresponding to the database version;

applying a second convolutional filter including a number of CPU calculation filter to generate a second feature map corresponding to the number of CPU cores;

combining the first feature map and the second feature map to generate a multi-dimensional filter; and applying the multi-dimensional filter to each layer of a neural network of the neural network model.

10. The non-transitory computer-readable medium of claim 9, wherein extracting the set of input parameters comprises:

executing extraction script at the on-premises system to extract metadata of the on-premises system; and generating the set of input parameters based on analyzing the metadata of the on-premises system.

11. The non-transitory computer-readable medium of claim 9, wherein the set of input parameters further comprises at least one of database edition, real application clusters (RAC), database size, database operating system, archive log mode, workload type, database services, autonomous database (ADB) features, database features, critical status, network bandwidth, and outage window, and wherein the set of output parameters comprises at least one of: target cloud versions, migration methods, target cloud shapes and sizes, licensing impact, and estimated time.

12. The non-transitory computer-readable medium of claim 9, wherein training the neural network model further comprises:

determining an order of multiple layers and a dependency between a node in a previous layer and a node in a layer following the previous layer in the neural network.

13. A system comprising one or more computers and one or more storage devices on which are stored instructions that are operable, when executed by the one or more computers, to cause the one or more computers to perform operations comprising:

receiving a plurality of parameters associated with an on-premises system to be migrated to a cloud architecture, the plurality of parameters including an identifier of the on-premises system, identifiers of components of the on-premises system, and migration requirements;

extracting, from the plurality of parameters, a set of input parameters substantially affecting a migration of the on-premises system to the cloud architecture, wherein the set of input parameters comprises a database version and a number of central processing unit (CPU) cores, and wherein the database version indicates whether support is available at a product vendor associated with the cloud architecture, or whether the database is outdated or on verge of support expiry;

identifying a target cloud architecture, selected from a plurality of cloud architectures, that i) is compliant with the set of input parameters, and ii) satisfies one or more threshold conditions associated with the migration;

determining, a set of output parameters representing features of the target cloud architecture; and training, a neural network model using the set of input parameters and the set of output parameters, wherein training the neural network model comprises:

applying a first convolutional filter including a database version filter to generate a first feature map corresponding to the database version;

applying a second convolutional filter including a number of CPU calculation filter to generate a second feature map corresponding to the number of CPU cores;

combining the first feature map and the second feature map to generate a multi-dimensional filter; and applying the multi-dimensional filter to each layer of a neural network of the neural network model.

14. The system of claim 13, wherein extracting the set of input parameters comprises:

executing extraction script at the on-premises system to extract metadata of the on-premises system; and generating the set of input parameters based on analyzing the metadata of the on-premises system.

15. The system of claim 13, wherein the set of input parameters further comprises at least one of database edition, real application clusters (RAC), database size, database operating system, archive log mode, workload type, database services, autonomous database (ADB) features, database features, critical status, network bandwidth, and outage window, and wherein the set of output parameters comprises at least one of: target cloud versions, migration methods, target cloud shapes and sizes, licensing impact, and estimated time.

16. The system of claim 13, wherein training the neural network model further comprises:
   determining an order of multiple layers and a dependency between a node in a previous layer and a node in a layer following the previous layer in the neural network.

* * * * *